(12) United States Patent
Esenther

(10) Patent No.: US 6,715,393 B2
(45) Date of Patent: Apr. 6, 2004

(54) CUTTING APPARATUS HAVING ADJUSTABLE CUTTER ASSEMBLY

(75) Inventor: Paul Esenther, Bartlet, IL (US)

(73) Assignee: Chicago, Slitter, Itasca, IL (US)

( * ) Notice: Subject to any disclaimer, the term of this patent is extended or adjusted under 35 U.S.C. 154(b) by 0 days.

(21) Appl. No.: 09/729,481

(22) Filed: Dec. 4, 2000

(65) Prior Publication Data

US 2002/0066348 A1 Jun. 6, 2002

(51) Int. Cl.$^7$ ................................................. B26D 7/26
(52) U.S. Cl. .................... 83/698.51; 83/342; 83/499; 83/504; 83/672
(58) Field of Search ............... 83/698.51, 698.61, 83/499, 504, 340, 342, 672

(56) References Cited

U.S. PATENT DOCUMENTS

| | | |
|---|---|---|
| 2,125,939 A | 8/1938 | Macfarren |
| 3,000,250 A | 9/1961 | Altmann et al. |
| 3,084,582 A | 4/1963 | Anderson |
| 3,110,209 A | 11/1963 | Takehara |
| 3,799,020 A | 3/1974 | Hoelmer |
| 4,004,479 A | 1/1977 | Bodnar |
| 4,630,514 A | 12/1986 | Ohmori et al. |
| 4,657,192 A | 4/1987 | Browning |
| 4,858,506 A | 8/1989 | Buta |
| 4,911,047 A * | 3/1990 | Hornung et al. ............... 83/342 |
| 4,984,491 A * | 1/1991 | Bragaglia ............ 83/698.61 X |
| 5,000,069 A * | 3/1991 | Knobel ...................... 83/342 X |
| 5,367,936 A * | 11/1994 | Held et al. ............... 83/698.61 |
| 5,904,086 A * | 5/1999 | Figge et al. ............. 83/698.61 |
| 5,950,516 A * | 9/1999 | Stab ........................ 83/698.51 |
| 6,295,909 B1 * | 10/2001 | Schofield et al. .... 83/698.61 X |

OTHER PUBLICATIONS

Product Brochure and Correspondence Regarding Butech Scrap Handling System, 25 pages, dated Nov. 9, 1999.

* cited by examiner

*Primary Examiner*—Charles Goodman
(74) *Attorney, Agent, or Firm*—Wood, Phillips, Katz, Clark & Mortimer

(57) ABSTRACT

A cutting apparatus is disclosed which is particularly suited for use in association with an apparatus for effecting lengthwise slitting of sheet stock, such as sheet metal. In the illustrated embodiment, the cutting apparatus includes first and second cooperating, counter-rotating pairs of knife assemblies, with each of the knife assemblies including at least one knife blade positioned for cutting cooperation with a respective knife blade of the other assembly. In order to facilitate adjustment of the gap or clearance between each cooperating pair of knife blades, the present apparatus includes an adjustment mechanism, whereby one of the knife assemblies can be shifted axially of the other assembly, thereby adjusting the clearance between the knife blades of the assemblies. Efficient adjustment of the cutting apparatus is thus provided, whereby the apparatus can efficiently cut opposite edge, scrap portions of sheet material as the sheet stock is slit by the slitter apparatus.

8 Claims, 4 Drawing Sheets

US 6,715,393 B2

CUTTING APPARATUS HAVING ADJUSTABLE CUTTER ASSEMBLY

TECHNICAL FIELD

The present invention relates generally to a power-driven cutting apparatus for cutting material such as sheet metal, and more particularly to a cutting apparatus which can be configured for use in connection with a sheet slitter, including an adjustable cutter mechanism for facilitating use with materials having varying thicknesses.

BACKGROUND OF THE INVENTION

During processing of sheet materials such as sheet metal, it is frequently necessary to subdivide rolls or pieces of sheet stock into narrower rolls or pieces. A slitter apparatus is typically employed for this purpose, with the apparatus including a plurality of cutting mechanisms which cut the sheet stock lengthwise to the desired narrower widths.

Attendant to slitting of sheet material in this fashion, it is common for opposite edge portions of the sheet stock to be cut, and recycled as scrap material. Because such pieces of scrap material have lengths corresponding to that of the original sheet stock, it is desirable to continuously cut the scrap edge portions as the slitter apparatus is operated to slit the sheet stock.

The present invention is directed to a cutter apparatus which is particularly suited for use in association with a sheet stock slitter, wherein the cutting apparatus of the present invention includes an adjustable cutter mechanism to facilitate handling of varying thicknesses of sheet material.

SUMMARY OF THE INVENTION

A cutting apparatus embodying the principles of the present invention is rotatably driven for use with an associated slitter apparatus, with the apparatus including cooperating knife assemblies to cut scrap edge portions of sheet stock as it is cut lengthwise by the slitter apparatus. The knife assemblies include opposed, opposite-hand, helical-like cutting knives, with counter-rotation of the knife assemblies moving respective ones of the knives into cutting cooperation with each other. The cutting edges of the opposing knives are offset, allowing a piece of material pinched therebetween to be sheared as the cutting edges converged toward each other as the knife assemblies are counter-rotated. Notably, the present apparatus includes an arrangement for axially offsetting one of the knife assemblies relative to the other, thereby acting to adjust the offset (i.e., horizontal knife clearance) between opposing ones of the knives. By this arrangement, the gap or clearance between the knives can be readily and efficiently selectively adjusted, thus promoting efficient cutting of scrap sheet material of varying thicknesses. In accordance with the illustrated embodiment, the cutting apparatus includes first and second pairs of knife assemblies, with the apparatus positioned in operative association with a sheet slitter, such that respective pairs of the knife assemblies cut the opposite edge scrap portions of sheet material as it is slit.

As disclosed herein, the present cutting apparatus includes a frame, and a pair of shafts rotatably mounted on the frame. The shafts are geared to each other for counter-rotation when one of the shafts is rotatably driven.

A pair of cooperating knife assemblies are respectively mounted on the shafts for counter-rotation therewith. Each of the knife assemblies includes a hub mounted on the respective one of the shafts, and at least one knife blade, so that counter-rotation of the shafts moves respective ones of the knife blades of the pair of knife assemblies into cutting cooperation with each other. In a current embodiment, each knife assembly includes four cutting blades evenly spaced (at 90 degrees) about the rotational axis of the knife assembly.

As noted, the present invention includes an adjustment mechanism for moving a movable one of the knife assemblies axially of the respective one of the shafts of the apparatus, to thereby alter the clearance between the cooperating knife blades. In order to provide adjustment in this manner, the one of the shafts on which the movable knife blade is axially movable is hollow, with the adjustment mechanism of the apparatus including an inner shaft positioned within the hollow shaft. The inner shaft is connected to the movable knife assembly, with the inner shaft being movable axially for axially moving the movable knife assembly.

The adjustment mechanism of the present invention further includes a motor-driven screw jack mounted on the apparatus frame, with the screw jack connected to the inner shaft of the adjustment mechanism for selectively reciprocably moving the inner shaft. A bearing housing connected to the screw jack operatively interconnects the screw jack with the reciprocably movable inner shaft, with the bearing housing having a pair of thrust bearings for reciprocably moving the inner shaft, while permitting rotation of the inner shaft relative to the bearing housing.

In the illustrated embodiment, the present cutting apparatus includes first and second pairs of cooperating knife assemblies, each of which is configured to include a movable knife assembly, and its own adjustment mechanism for adjustably positioning the movable one of the knife assemblies. Efficient operation of an associated sheet slitter apparatus is thus promoted, with each pair of adjustable knife assemblies acting to continuously cut the opposite edge scrap portions of sheet material as the material is slit lengthwise.

Other features and advantages of the present invention will become readily apparent from the following detailed description, the accompanying drawings, and the appended claims.

DETAILED DESCRIPTION

Figure 1:
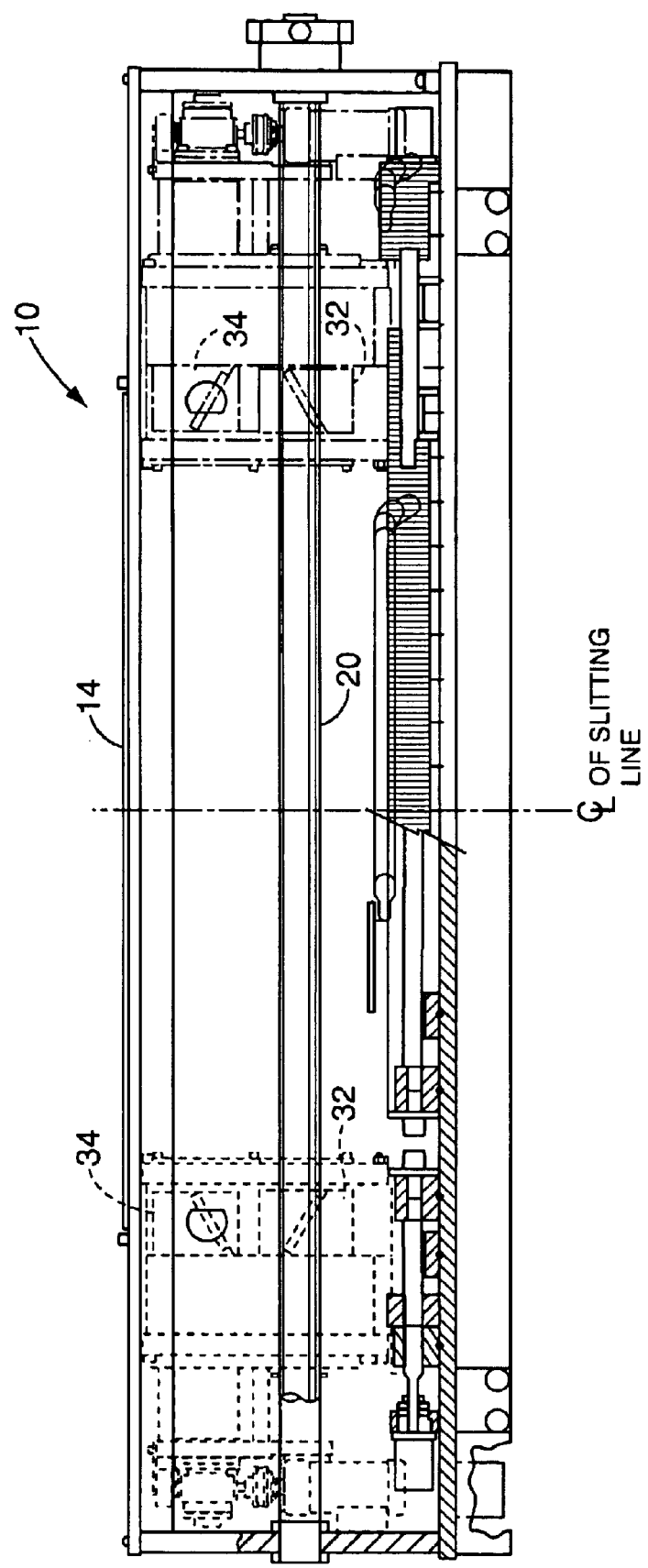
FIG. 1 is a diagrammatic, front plan view of a cutting apparatus, including first and second pairs of cooperating knife assemblies, embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference first to FIG. 1, therein is illustrated a cutting apparatus 10 embodying the principles of the present invention. As will be further described, cutting apparatus 10 includes first and second pairs of cooperating, counter-rotating knife assemblies, which are rotatably driven to effect cutting of material fed between each of the pairs of knife assemblies. While the present invention is presently configured in this form for use in association with an apparatus for slitting sheet material for cutting scrap edge portions, it is to be understood that a cutting apparatus embodying the principles of the present invention may be configured to include but a single pair of counter-rotating knife assemblies, and can be configured for use in applications apart from use in conjunction with an associated slitter apparatus.

Figure 2:
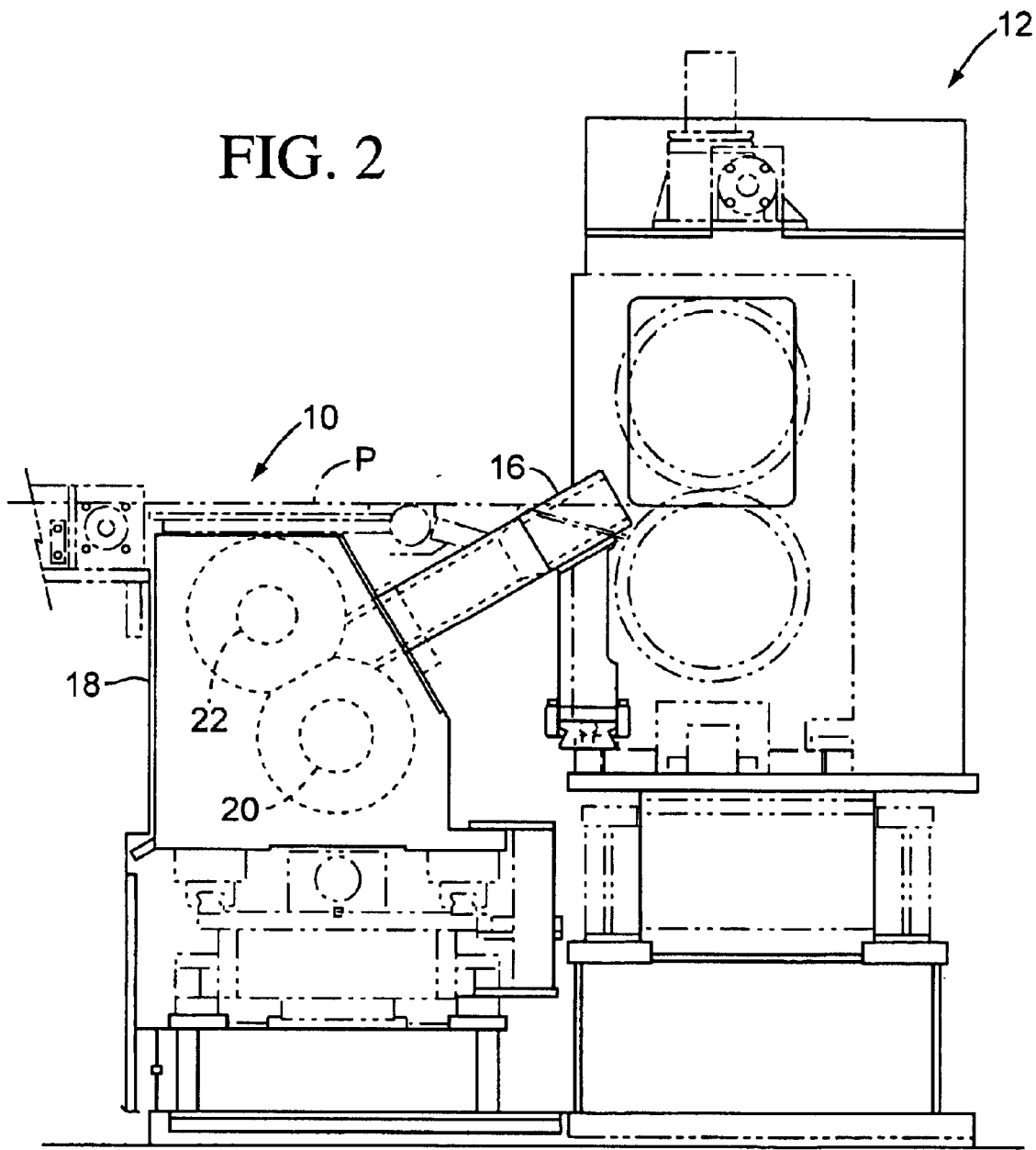
FIG. 2 is an end elevational view of the cutting apparatus illustrated in FIG. 1, shown in position with an associated slitter apparatus.

FIG. 2 illustrates the cutting apparatus 10 positioned in operative association with an associated slitter apparatus 12. The slitter apparatus includes counter-rotating shafts on which pairs of cooperating cutting knives are provided, whereby direction of sheet material, typically sheet metal, through the slitter apparatus effects lengthwise cutting of the material into a plurality of sub-divided components. FIG. 2 illustrates in phantom line P, the path along which sheet material is fed and slit by the slitter apparatus 12, with the cutting apparatus 10 including an upper table 14 along which the subdivided components of sheet stock are directed.

Attendant to slitting of sheet stock, opposite edge portions of the sheet material are generally cut to form scrap which is cut into short lengths to facilitate collection and recycling. These scrap, opposite edge portions of the sheet stock are respectively fed through the first and second pairs of counter-rotating knife assemblies of the present cutting apparatus 10, with each of the pairs of knife assemblies being configured for adjustment to facilitate efficient cutting of different thicknesses of material. For purposes of the present disclosure, a single pair of the knife assemblies, and the adjustment mechanism respectively associated therewith, will be described, with the understanding that the apparatus 10 is configured in the illustrated embodiment to include like adjustable knife assemblies positioned to receive the opposite scrap edge portions from sheet stock as it is slit by slitter apparatus 12.

Figure 3:
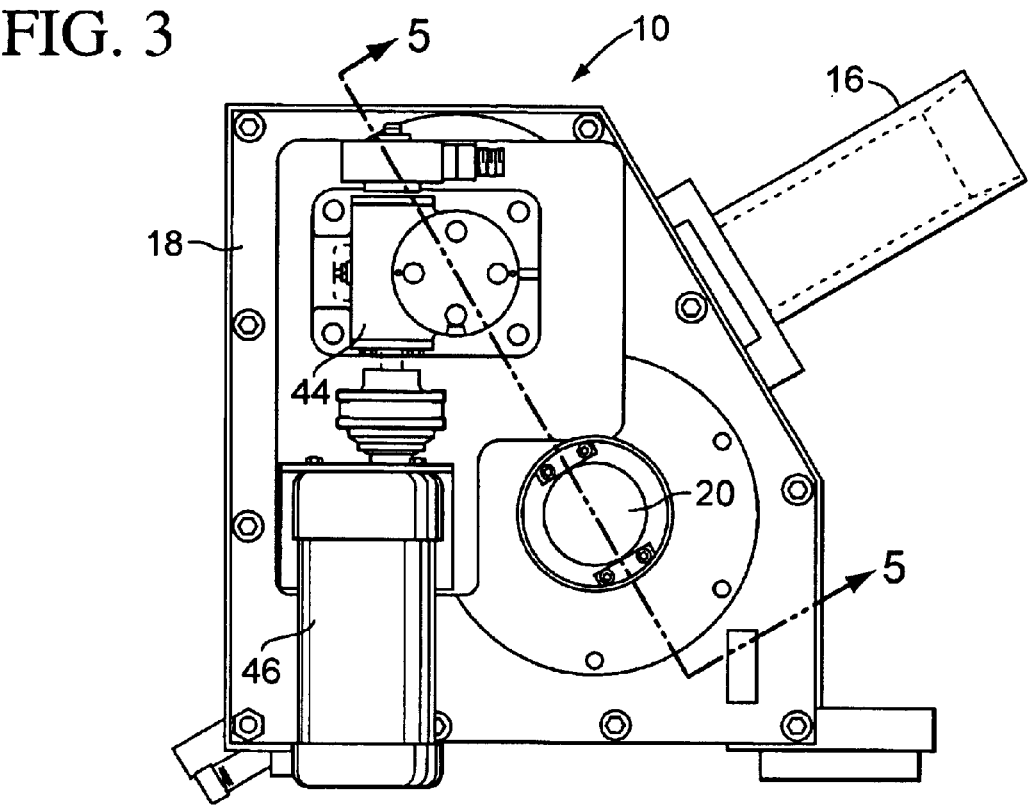
FIG. 3 is an end elevational view of the present cutting apparatus.
Figure 4:
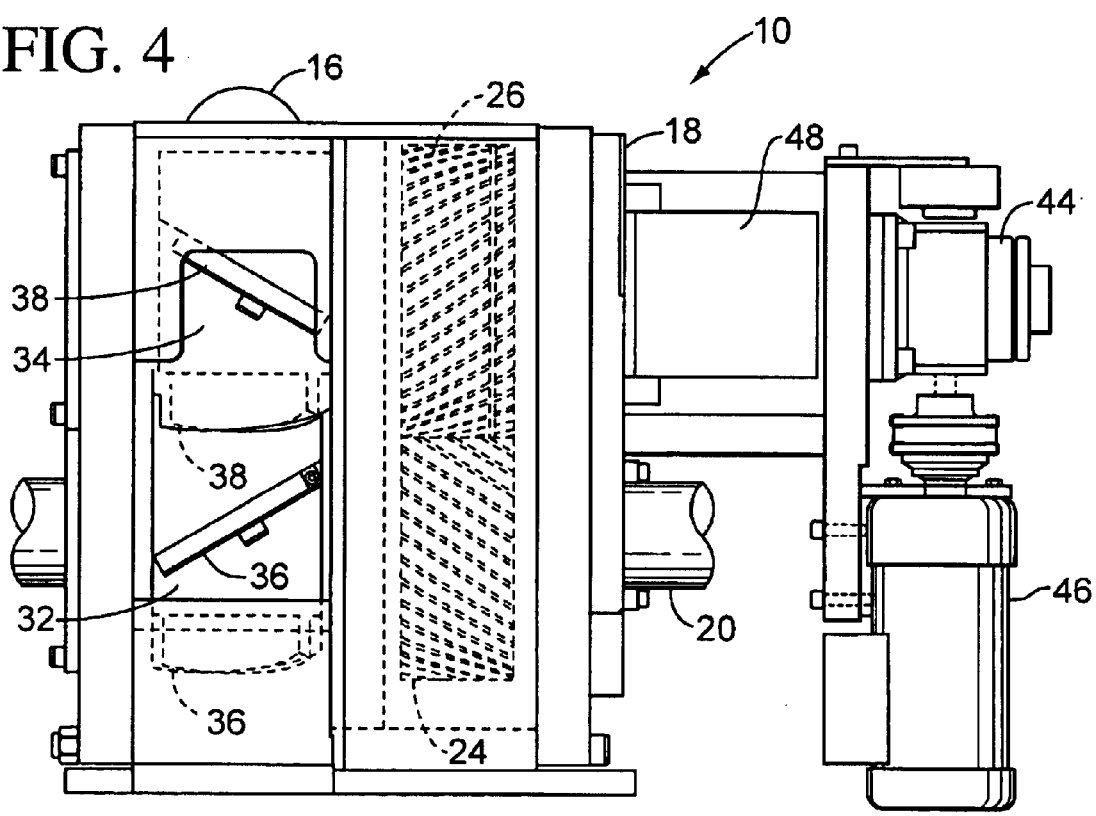
FIG. 4 is a fragmentary, front elevational view of the present cutting apparatus, showing one pair of cooperating knife assemblies thereof.

With further reference to FIG. 2, and as further illustrated in FIGS. 3 and 4, apparatus 10 includes an entry chute 16 associated with each of the pairs of counter-rotating knife assemblies for directing material to be cut into the nip of the rotating assemblies. The cutting apparatus includes a frame 18 which rotatably supports a pair of counter-rotating shafts 20, 22 respectively associated with each of the knife assemblies of the first and second pairs. In the illustrated embodiment, the lower shaft 20 is configured for driven rotation, with a pair of cooperating, intermeshing gears 24, 26 connecting the shafts 20 and 22 for driven, counter-rotation. In the illustrated embodiment, including first and second pairs of cooperating knife assemblies, the lower one of the shafts 20 extends the length of the apparatus (see FIG. 1), with the apparatus preferably including a pair of the upper ones of the shafts 22 respectively associated with each of the first and second pairs of counter-rotating knife assemblies. Each of the upper shafts 22 is driven in counter-rotation by the lower shaft 20 by a respective pair of the gears 24, 26. Thus, driven rotation of lower shaft 20 acts through each of the gear sets to effect driven, counter-rotation of the upper shafts 22. While FIG. 5 illustrates gear 26 as being integral with the upper shaft 22 (which is hollow, as will be further described), it will be understood that the gear 26 can be formed separately from, or integrally with the shaft 22.

Suitable bearing assemblies 28 and 30 respectively mount the lower shaft 20 and upper shaft 26 in the frame 18 of cutting apparatus 10. Lubricant seals are provided as necessary for retaining lubricant within an enclosure of the frame within which the cooperating gears 24, 26 are positioned.

Figure 5:
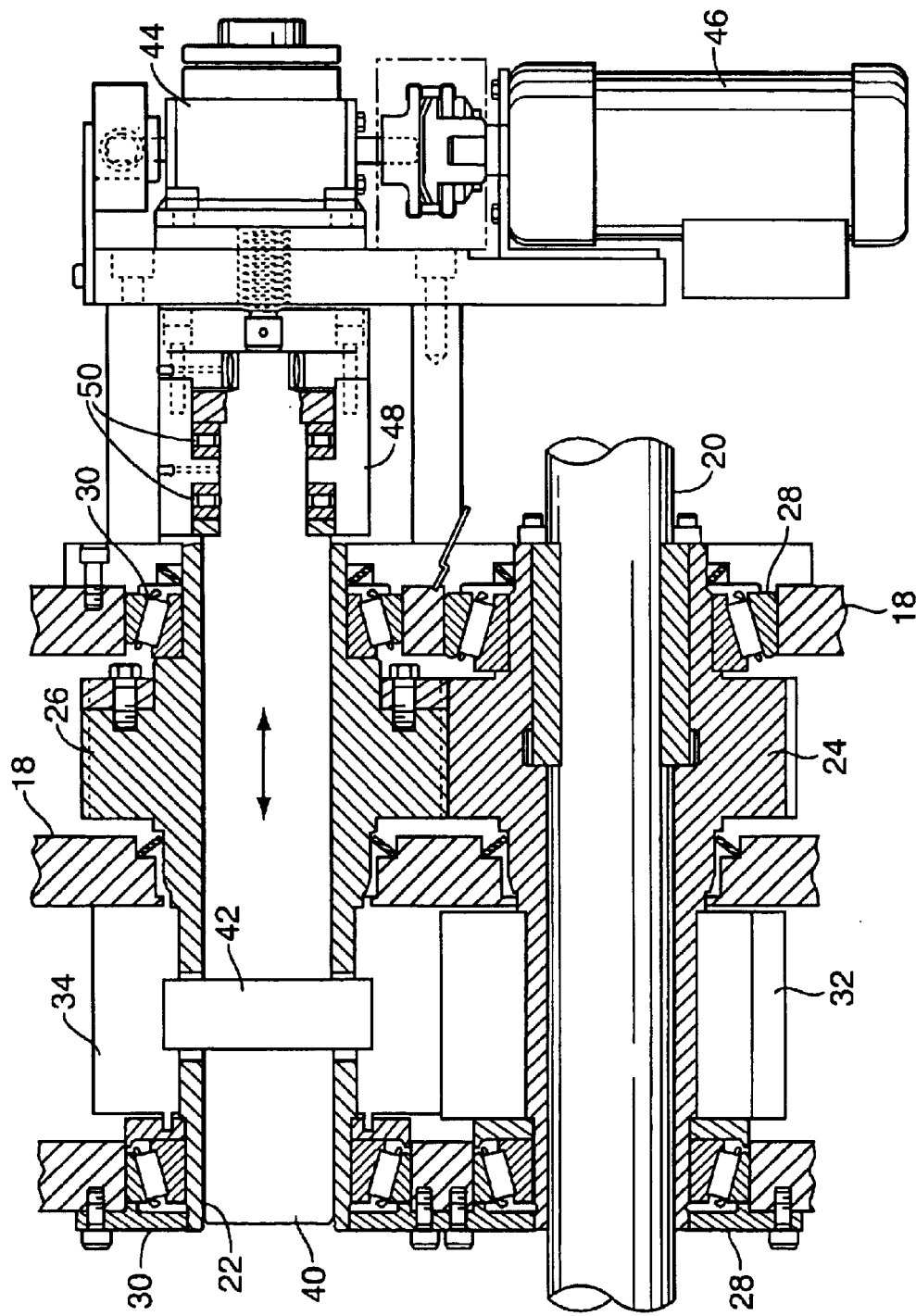
FIG. 5 is a fragmentary, diagrammatic cross-sectional view taken generally along lines 5—5 of FIG. 3 illustrating an adjustment mechanism of the present apparatus for adjustably positioning one of the knife assemblies of the illustrated pair of knife assemblies.

FIGS. 4 and 5 illustrate one of the pairs of knife assemblies of the present apparatus, including a lower knife assembly 32 mounted on lower shaft 20, and an upper knife assembly 34 mounted on the upper shaft 22. Driven rotation of lower shaft 20, acting through gears 24, 26, effects counter-rotation of the knife assemblies 32, 34. As illustrated in FIG. 4, each of the knife assemblies includes a hub on which is mounted at least one knife blade, respectively designated 36, 38, with counter-rotation of the knife assemblies moving the generally helically-oriented knife blades into cutting cooperation with each other. Typically, the knife blades are spaced from each other as they are relatively rotated for cutting cooperation, with the present invention including an adjustment mechanism, as will be described, for selectively varying the spacing or gap between the cooperating knife blades. By this mechanism, the present apparatus can be efficiently configured to cut material of varying thicknesses.

In a current embodiment of the present invention, each of the knife assemblies includes a plurality of circumferentially spaced knife blades, respective ones of which are counter-rotated into cutting cooperation. Thus, as shown in FIG. 4, knife assembly 32 is shown as including two of the knife blades 36, with the knife assembly preferably including four such knife blades equally circumferentially spaced about the rotational axis of the knife assembly. Similarly, knife assembly 34 is shown as including two of the knife blades 38 removably mounted thereon. It should be noted that the knife assemblies of the other pair (for cutting the opposite scrap edge portion) of the cutting apparatus 10 are similarly configured, but are preferably positioned 45° out-of-phase with the illustrated knife assemblies, whereby each pair of knife assemblies of the apparatus alternately effects cutting of its respective strip of scrap material being directed therethrough.

As will be appreciated, the gap or clearance between each cooperating pair of knife blades of each of the knife assemblies can be selectively adjusted by axially moving one of the knife assemblies relative to the other knife assembly. The adjustment mechanism for effecting this adjustable movement is shown in FIG. 5. As noted, the upper one of the shafts 22 is preferably of a hollow configuration, with the adjustment mechanism of the present invention including an inner shaft 40 reciprocably movable within the shaft 22. The inner shaft 40 is operatively connected by a pull bar 42 with the hub of knife assembly 34, whereby the knife assembly 34 can be axially moved on the shaft 32 while rotated therewith (each of the knife assemblies is suitably keyed to its respective shaft for the desired counter-rotation of the knife assemblies).

The adjustment mechanism of the present invention includes a screw jack 44 suitably mounted on the frame 18 of the apparatus for effecting selective, reciprocable movement of the inner shaft 40. Drive motor 46 operates the screw jack 44, whereby reversible, driven input to the screw jack effects reciprocation of its output shaft, which is operatively connected to inner shaft 40. To this end, the adjustment mechanism includes a bearing housing 48 within which are positioned a pair of thrust bearings 50 which act against thrust collars mounted on the inner shaft 40. By this arrangement, reciprocable movement of the bearing housing 48 by operation of motor 46 acts through the thrust bearings 50 to reciprocably move inner shaft 40, in turn, reciprocably, axially moving the knife assembly 34.

As noted, each of the first and second pairs of cooperating knife assemblies of apparatus 10 is preferably provided with an adjustment mechanism as described, including a screw jack 44 and drive motor 46. By this arrangement, each of the pair of knife assemblies can be independently, selectively adjusted for varying the cutting gap or clearance between the respective pairs of knife blades of the counter-rotating knife assemblies.

As noted, the cooperating knives of each of the first and second pairs of knife assemblies typically effect a shear-like cutting action on associated material, with the gap or clearance between the pair of blades being selectively varied by the disclosed adjustment mechanism for efficient cutting of materials of different thicknesses. However, while the knife assemblies are typically adjusted so as to provide a gap or clearance between each cooperating pair of knife blades, the adjustment mechanism for each pair of knife assemblies can be operated so that each cooperating pair of knife blades can be moved into interfering engagement with each other. Notably, adjustment of the knife assemblies in this fashion desirably permits a "self-sharpening" of each cooperating pair of knife blades, as the knife blades engage each other with a scissors-like action. Thus, the knife blades of the present apparatus can be readily maintained in a sharpened condition, without attendant down time for disassembly and individual sharpening of the knife blades.

From the foregoing, numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. An apparatus for cutting material, comprising:
    a frame;
    a pair of shafts rotatably mounted on said frame, said shafts being geared to each other for counter-rotation when rotatably driven;
    a pair of cooperating knife assemblies respectively mounted on said shafts for counter-rotation therewith, each of said knife assemblies including a hub mounted on the respective one of said shafts, and at least one generally helically-oriented knife blade, so that counter-rotation of said shafts moves respective ones of said knife blades of said pair of knife assemblies into cutting cooperation with each other; and
    an adjustment mechanism for moving a movable one of said knife assemblies axially of the respective one of said shafts to thereby alter the clearance between said generally helically-oriented knife blades by relative axial movement of said knife blades.

2. An apparatus for cutting material in accordance with claim 1, wherein:
    said one of said shafts on which the movable knife assembly is axially movable is hollow, said adjustment mechanism including an inner shaft positioned within said hollow one of said shafts connected to said movable knife assembly, said inner shaft being movable axially for axially moving said movable knife assembly.

3. An apparatus for cutting material in accordance with claim 2, wherein:
    said adjustment mechanism further includes a motor-driven screw jack mounted on said frame and connected to said inner shaft for selectively reciprocably moving said inner shaft.

4. An apparatus for cutting material in accordance with claim 3, wherein:
    said adjustment mechanism includes a bearing housing connected to said screw jack, said bearing housing having a pair of thrust bearings for reciprocably moving said inner shaft while permitting rotation of said inner shaft relative to said bearing housing.

5. An apparatus for cutting material in accordance with claim 1, wherein:
    said apparatus including first and second pairs of said cooperating knife assemblies, each of said pairs including a movable knife assembly, said apparatus including a pair of said adjustment mechanisms respectively operatively connected to the movable one of said knife assemblies of each of said pair of knife assemblies.

6. An apparatus for cutting material in accordance with claim 2, wherein:
    the other one of said shafts is driven for rotatably driving said knife assemblies.

7. An apparatus for cutting material, comprising:
    a frame;
    a pair of shafts rotatably mounted on said frame, said shafts being geared to each other for counter-rotation when rotatably driven;
    a pair of cooperating knife assemblies respectively mounted on said shafts for counter-rotation therewith, each of said knife assemblies including a hub mounted on the respective one of said shafts, and at least one generally helically-oriented knife blade, so that counter-rotation of said shafts moves respective ones of said knife blades of said pair of knife assemblies into cutting cooperation with each other;
    an adjustment mechanism for moving a movable one of said knife blades axially of the respective one of said shafts to thereby alter the clearance between said generally helically-oriented knife blades by relative axial movement of said knife blades, said adjustment mechanism including an inner shaft positioned within a hollow one of said shafts connected to said movable knife assembly, said inner shaft being movable axially for moving said movable knife assembly,
    said adjustment mechanism further including a screw jack mounted on said frame, and connected to said inner shaft for selectively reciprocably moving said inner shaft, and a bearing housing connected to said screw jack, said housing including thrust bearing means for reciprocably moving said inner shaft while permitting rotation of said inner shaft relative to said bearing housing.

8. An apparatus for cutting material in accordance with claim 7, wherein:
    said apparatus includes first and second pairs of said cooperating knife assemblies, each of said pairs including a movable knife assembly, said apparatus including a pair of said adjustment mechanisms respectively operatively connected to the movable ones of said knife assemblies of each of said pair of knife assemblies.

* * * * *